United States Patent [19]

Bundy et al.

[11] 4,076,548

[45] Feb. 28, 1978

[54] HIGH BULKING CLAY PIGMENTS AND METHOD OF MAKING THE SAME

[75] Inventors: Wayne M. Bundy, Westfield; Joseph P. Berberich, Barnegat; David Sastre, Elizabeth, all of N.J.

[73] Assignee: Yara Engineering Corporation, Elizabeth, N.J.

[21] Appl. No.: 754,905

[22] Filed: Dec. 27, 1976

Related U.S. Application Data

[63] Continuation-in-part of Ser. No. 591,851, Jun. 30, 1975.

[51] Int. Cl.² .............................................. C04B 31/26
[52] U.S. Cl. ................... 106/288 B; 106/291; 106/DIG. 3; 209/5; 106/72
[58] Field of Search .............. 106/291, 288 B, 72, 106/DIG. 3; 209/5; 210/53, 54

[56] References Cited

U.S. PATENT DOCUMENTS

| | | | |
|---|---|---|---|
| 3,533,821 | 10/1970 | Lundquist | 106/306 |
| 3,778,281 | 12/1973 | Brown et al. | 106/71 |
| 3,837,482 | 9/1974 | Sheridan | 209/5 |
| 3,837,488 | 9/1974 | Young | 209/167 |
| 3,849,151 | 11/1974 | Abercrombie, Jr. | 106/72 |
| 3,850,653 | 11/1974 | Zenlz, Jr. | 106/288 B |
| 3,862,027 | 1/1975 | Mercade | 106/288 B |
| 3,879,283 | 4/1975 | Mercade | 106/288 B |

*Primary Examiner*—J. Poer
*Assistant Examiner*—J. V. Howard
*Attorney, Agent, or Firm*—Buell, Blenko & Ziesenheim

[57] ABSTRACT

A high bulk clay product and method of making the same are provided in which kaolinite is selectively flocculated to produce an ultra fine particle fraction in the presence of fine mica below 150 mesh in size and the resulting flocculant is collected and dried.

7 Claims, No Drawings

HIGH BULKING CLAY PIGMENTS AND METHOD OF MAKING THE SAME

This application is a continuation-in-part of our co-pending application Ser. No. 591,851, filed June 30, 1975.

This invention relates to high bulking clay pigments and methods of making the same and particularly to a clay product producing higher void volume in coatings in which it is the primary pigment.

The demand for opacifying pigments in various industries, such as for example, in coating materials, has been long recognized and many mineral materials have been proposed and used. The primary and most used opacifier for this purpose is titanium dioxide.

We have discovered that we can obtain better opacity and improved brightness and reflectance in coatings as compared with $TiO_2$, by the use of kaolinite which has been treated to incorporate voids to form a high bulking clay.

We have found that this can be accomplished by selective flocculation of ultra fine particles of clay and by combining the fine particles with mica particles below 150 mesh in size. The amount of mica present is as a minimum an effective amount to cause the formation of voids up to a maximum limit at which the mica adversely affects the pigment quality of the kaolin. In general this is about 0.025% to about 5% on the weight of the kaolin.

We have found that kaolinite can be selectively flocculated to recover ultra fine particles by the use of low molecular weight (below 1,000,000) organic flocculants in the presence of a mineral acid flocculant. We prefer to use a mixture of polyamine and citric acid as the flocculant in our process with the addition of a mineral acid to reduce the pH to cause a clear separation of the selectively flocculated kaolin.

The invention will be perhaps most readily understood by reference to the following examples.

EXAMPLE I

A kaolinite generally known as Coss Hodges (Y-684) from the Sandersville, Georgia area was blunged in water with 0.08% sodium hexametaphosphate and fractionated to 0.08 cps at 10 minutes (i.e. 94% less than 2μ). The pH of the recovered fraction was raised to 8.8 using sodium hyroxide (0.40% solution). The fraction was then treated with 0.10% Ethylenediamine + 0.30% Citric Acid in a 0.40% solution of water. It contained up to 0.1% of mica in the size range less than 150 mesh. It was then flocculated to pH 2.5 using a 10% solutin of sulfuric acid and bleached using 5 lbs/ton of sodium hydrosulfite, filtered and rinsed. The filter cake was then attrition ground and dried at 65° C.

EXAMPLE II

Another Coss Hodges (Y-535) kaolinite from Sandersville, Georgia area was blunged in water with 0.08% sodium hexametaphosphate and fractionated to 0.08 cps at 10 minutes. The pH of the recovered fraction was raised to 8.8 using sodium hydroxide (0.40% solution). The fraction was then treated with 0.10% Ethylenediamine + 0.30% Citric Acid in a 0.40% solution of water. It contained up to 0.3% of mica in the size range less than 150 mesh. It was then flocculated to pH 2.5 using a 10% solution of sulfuric acid and bleached using 5 lbs./ton of sodium hydrosulfite, filtered and rinsed. The filter cake was then attrition ground and dried at 65° C.

The two kaolinites were incorporated in standard coatings and the gloss, reflectance (nm) whiteness and % opacity were determined. The values appear in Table I.

TABLE I

| Sample | % 325 Mesh Residue | 75° Gloss | (Brighteners) R 457 nm | Whiteness Index | % Opacity |
|---|---|---|---|---|---|
| Example I (Control) | | 47 | 72.3 | 32 | 89.9 |
| Example I | 0.0193 | 51.8 | 72.7 | 30.9 | 90.8 |
| Example II (Control) | | 56 | 73 | 30 | 90.0 |
| Example II | 0.0383 | 56.2 | 73.7 | 29.3 | 91.0 |

EXAMPLE III

A kaolinite generally known as Meek's Crude, Y-707 from the Sandersville, Georgia area was blunged in water with 0.08% sodium hexametaphosphate and sodium hydroxide (0.40% solution) to pH 7.4. The crude slurry was then fractionated to 0.06 cps at 10 minutes. The fraction was then screened through a 200 mesh screen. To the screened fraction, 0.10% of 325 Mesh White Waterground Mica was added. The clay then contained 0.4 to 0.7% mica in the size range less than 200 mesh. It was then flocculated to pH 2.5 using 10% solution of sulfuric acid and bleached using 10 lbs./ton of sodium hydrosulfite, filtered and rinsed. The filter cake was then dispersed with 0.30% sodium hexametaphosphate and sodium hydroxide (0.40% solution) to pH 7.4 and dried at 65° C. The coating properties of this untreated clay with and without added micas are the same and appear in Table II. This is the control sample for Examples IV and V.

EXAMPLE IV

Another Meek's Crude, Y-707 kaolinite from the Sandersville, Georgia area was blunged in water with 0.08% sodium hexametaphosphate and sodium hydroxide (0.40% solution) to pH 7.4. The crude slurry was then fractionated to 0.06 cps at 10 minutes. The pH of the recovered fraction was raised to 8.8 using sodium hydroxide (0.4% solution). The fraction was then treated with 0.10% Hexamethylenediamine + 0.10% Citric Acid in a 0.20% solution of water. The clay contained 0.3 to 0.6% mica in the size range less than 200 mesh. It was then flocculated to pH 2.5 using 10% solution of sulfuric acid and bleached using 10 lbs./ton of sodium hydrosulfite, filtered and rinsed. The filter cake was then dispersed with 0.3% sodium hexametaphosphate and sodium hydroxide (0.40% solution) to pH 7.4 and dried at 65° C.

EXAMPLE V

A third Meek's Crude, Y-707 kaolinite from the Sandersville, Georgia area was blunged in water with 0.08% sodium hexametaphosphate and sodium hydroxide (0.40% solution) to pH 7.4. The crude slurry was then fractionated to 0.06 cps at 10 minutes. The 0.06 fraction was then screened through a 200 mesh screen. The pH of the screened material was raised to 8.8 using sodium hydroxide (0.40% solution). To this fraction, 0.10% of 325 Mesh White Waterground Mica was added. The clay contained 0.4 to 0.7% mica in the range less than 200 mesh. The fraction was then treated with 0.10% Hexamethylenediamine + 0.10% Citric Acid in a 0.20% solution of water. It was then flocculated to pH 2.5 using 10% solution of the sulfuric acid and bleached using 10 lbs./ton of sodium hydrosulfite, filtered and rinsed. The filter cake was then dispersed with 0.3% sodium hexametaphosphate and sodium hydroxide (0.40% solution) to pH 7.4 and dried at 65° C.

The three foregoing kaolinites were incorporated in standard coatings and the gloss, reflectance, whiteness and % opacity determined. The values appear in Table II.

TABLE II

| Sample | 75° Gloss | (Brighteners) R 457 nm | Whiteness Index | % Opacity |
| --- | --- | --- | --- | --- |
| Example III (Control) | 55.7 | 72.7 | 31.2 | 90.6 |
| Example III (+ mica) | 55.7 | 72.7 | 31.2 | 90.6 |
| Example IV | 54.9 | 73.4 | 30.0 | 91.1 |
| Example V | 54.8 | 74.0 | 29.6 | 91.6 |

It can be seen from the foregoing Table that selected flocculation of fine particles Example IV improved the opacity, whiteness and brightness over the clay merely separated by sieving even with addition of mica Example III, whereas the combination of selective flocculation plus the addition of mica, Example V produced the greatest increase in % opacity, whiteness and brightness.

While we have set out certain preferred practices and embodiments of our invention in the foregoing specification it will be understood that this invention may be otherwise embodied within the scope of the following claims.

We claim:

1. A method of improving the opacity of kaolinite comprising the steps of:
   a. selectively flocculating a kaolinite in the presence of an effective amount of fine mica below 150 mesh in size to cause voids to occur between the particles of kaolinite to recover a mixture of ultrafine particle clay and mica mixture, and
   b. collecting and drying the selectively flocculated ultrafine kaolinite and mica mixture as a high bulking dry pigment material.

2. A method as claimed in claim 1 wherein selective flocculation of the kaolinite is carried out by the addition of an organic flocculant having a molecular weight below 1,000,000.

3. A method as claimed in claim 1 wherein selective flocculation of the kaolinite is carried out by the addition of a polyamine and citric acid.

4. A method as claimed in claim 1 wherein the selective flocculation was carried out with the addition of ethylenediamine and citric acid.

5. A high bulking kaolinite consisting essentially of fine particle size kaolinite admixed with mica having a size below 150 mesh.

6. A high bulking kaolinite as claimed in claim 5 wherein the kaolinite is recovered by selective flocculation with an organic flocculant having a molecular weight less than 1,000,000.

7. A high bulking kaolinite as claimed in claim 5 wherein the kaolinite is recovered by selective flocculation with a polyamine and citric acid mixture.

* * * * *